Nov. 14, 1967  M. E. KENNEDY  3,352,566
COMPOSITE METAL AND PLASTIC SKI AND METHOD FOR MAKING SAME
Filed May 13, 1966  4 Sheets-Sheet 1
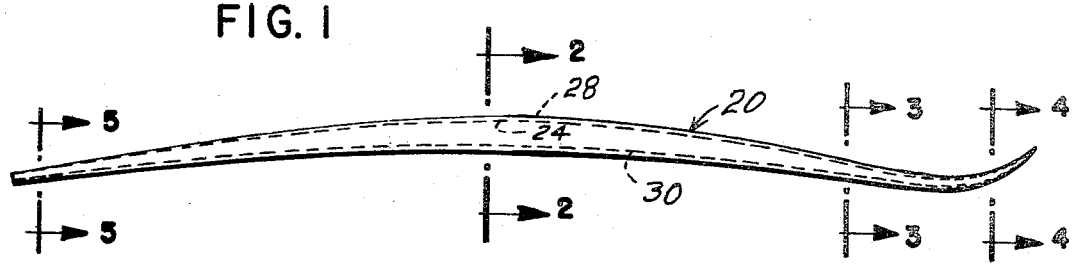
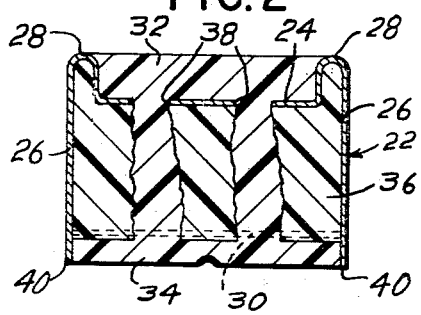
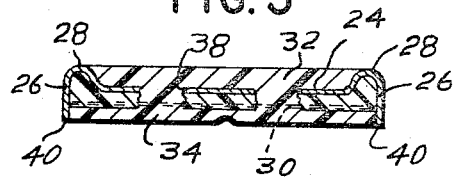
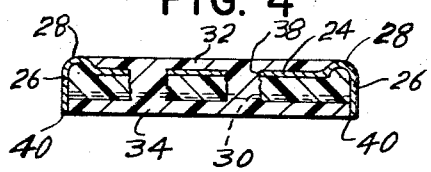
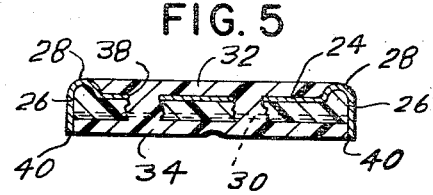
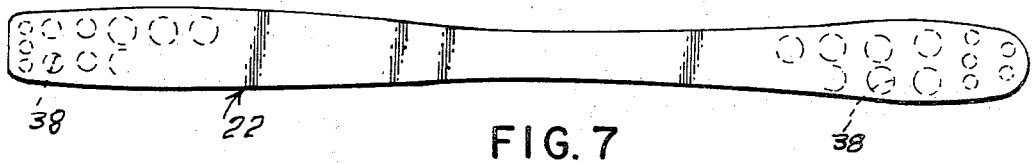
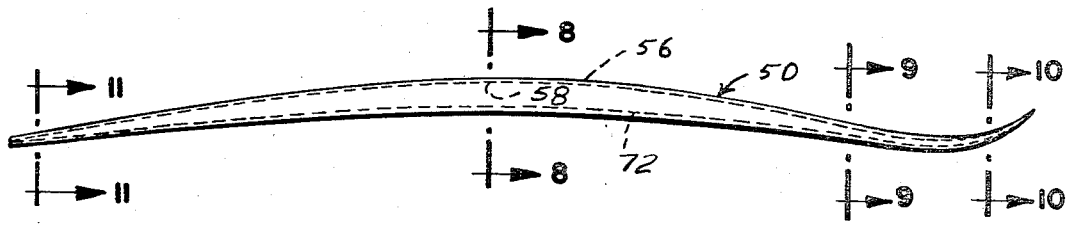
INVENTOR.
Michael E. Kennedy
BY
T W Secrest
ATTORNEY

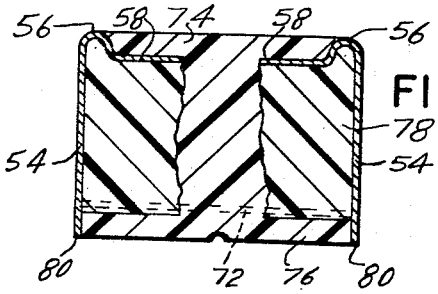
FIG. 8
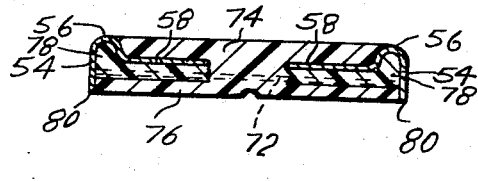
FIG. 9
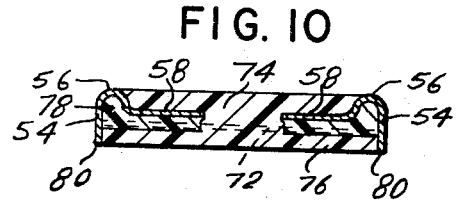
FIG. 10
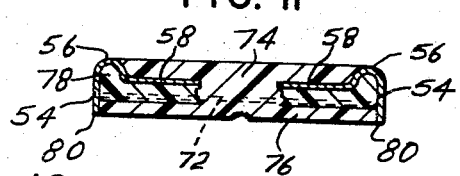
FIG. 11
FIG. 12
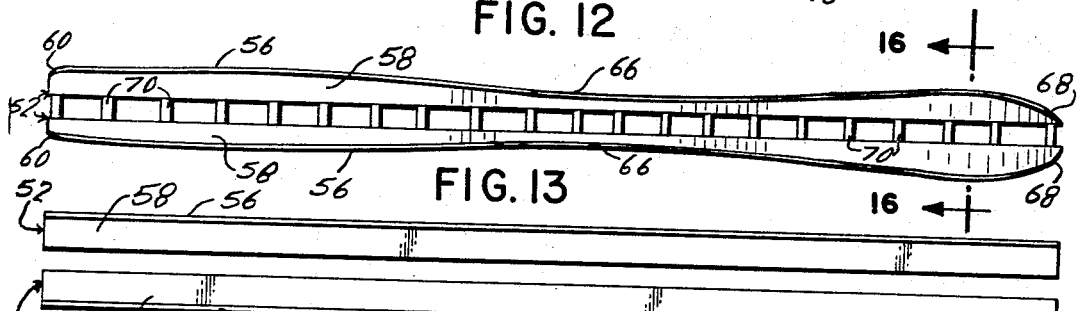
FIG. 13
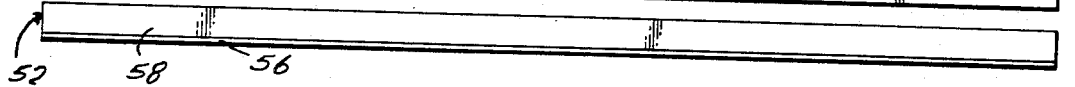
FIG. 14
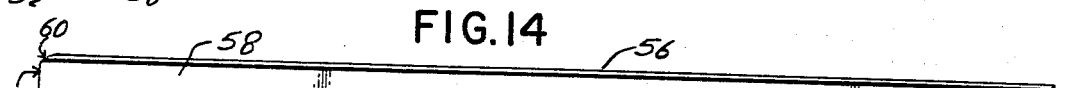
FIG. 15
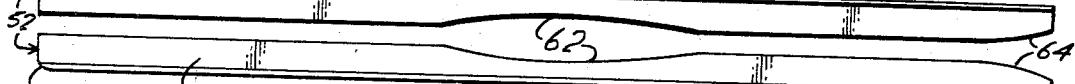
FIG. 16
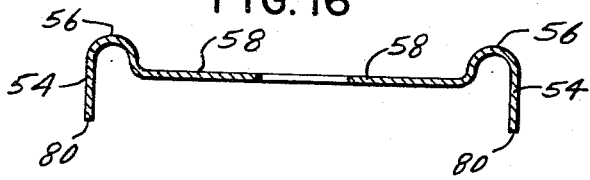

Nov. 14, 1967 M. E. KENNEDY 3,352,566
COMPOSITE METAL AND PLASTIC SKI AND METHOD FOR MAKING SAME
Filed May 13, 1966
4 Sheets-Sheet 3
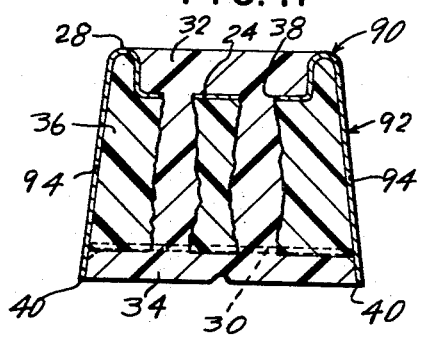
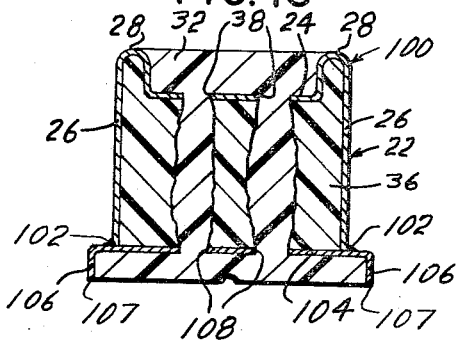
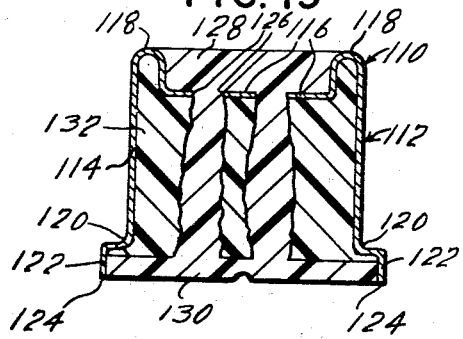
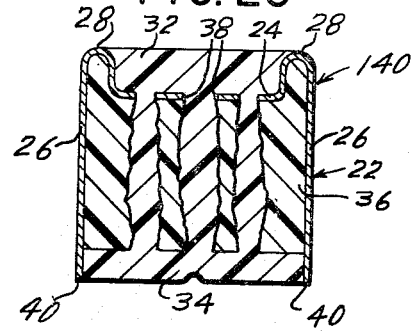
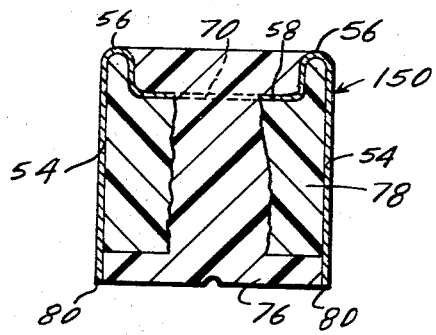
INVENTOR,
Michael E. Kennedy
BY
TW Secrest
ATTORNEY Nov. 14, 1967 — M. E. KENNEDY — 3,352,566
COMPOSITE METAL AND PLASTIC SKI AND METHOD FOR MAKING SAME
Filed May 13, 1966

INVENTOR
Michael E. Kennedy
BY
T W Sarest
ATTORNEY

United States Patent Office 3,352,566
Patented Nov. 14, 1967

3,352,566
COMPOSITE METAL AND PLASTIC SKI AND
METHOD FOR MAKING SAME
Michael E. Kennedy, Mercer Island, Wash., assignor to
Peter Kennedy, Incorporated, Seattle, Wash., a corporation of Washington
Filed May 13, 1966, Ser. No. 559,667
47 Claims. (Cl. 280—11.13)

This application is a continuation-in-part of application Serial Number 262,400 filed March 4, 1963 and now abandoned.

This invention relates to a ski and the method for making the same.

Over the years there have been developed and used many different skis. For example, one of the first used and one of the most elementary of skis is the wooden ski. This ski is cut from a wooden block and formed to the configuration desired by the skier. Then, as an improvement, the lower cutter edges of the ski were rabbeted and metal running edges were connected to the ski. To increase the strength of the ski, wooden veneer members were laminated. Then, there came the usage of wood and metal laminated together. Also, some of the more recent skis have had a plastic base with metal running edges. The metal running edges may be molded into the plastic base or plastic running surface, or the metal edges may be connected to the inner body of the ski by means of metal connectors. The person familiar with the manufacture of laminated objects and laminated skis is well aware of the cost of laminating veneers. Because of the cost, the resulting ski is priced out of the range of many would-be purchasers.

With this knowledge of making of skis and the cost of making the same, I have endeavored, with this invention, to make a high-quality but low-cost ski having a metal skeleton frame and a plastic body bonded to the frame. With my invention I have eliminated the necessity of laminating veneers to make a ski. Accordingly, one of the advantages of this invention is a ski having an integral metal skeleton frame and a plastic body bonded to the frame; a ski requiring less maintenance than the conventional ski; a ski which needs no wax on the running surface as the plastic body is sufficiently smooth; a ski where there is no possibility of delamination of the veneer; a closer control of the ski so that the desired flexibility of a racing ski can be realized and, also, the desired flexibility of a pleasure ski can be realized; a ski having a more closely controlled configuration for the downhill model of a ski and, also, for the slalom model of the ski; a ski which is relatively light in weight; a ski having an integral running edge with the result that there is no chance for the edge to become separated from the body of the ski; a ski having an integral top edge to provide a more firm positioning for the ski binding; and, a less expensive method for making a ski than the conventional method employed in laminated methods.

These and other objects and advantages of the invention will be more particularly brought forth upon reference to the accompanying drawings, the detailed specifications for the invention and the appended claims.

In the drawing:

FIGURE 1 is a side elevational view of one species of a ski having a body of one piece of metal and plastic bonded thereto;

FIGURE 2, taken on line 2—2 of FIGURE 1, is a lateral cross-sectional view of the ski near the central portion;

FIGURE 3, taken on line 3—3 of FIGURE 1, is a lateral cross-sectional view of the ski near the front portion;

FIGURE 4, taken on line 4—4 of FIGURE 1, is a lateral cross-sectional view at the tip of the ski;

FIGURE 5, taken on line 5—5 of FIGURE 1, is a lateral cross-sectional view taken near the rear end of the ski;

FIGURE 6 is a plan view of the metal blank of the ski of FIGURES 1–5 and on which metal blank there is bonded a plastic;

FIGURE 7 is a side elevational view of another preferred embodiment of the ski constructed in accordance with the teachings of this invention;

FIGURE 8, taken on line 8—8 of FIGURE 7, is a lateral cross-sectional view of the ski near the central portion;

FIGURE 9, taken on line 9—9 of FIGURE 7, is a lateral cross-sectional view of the same near the front of the same;

FIGURE 10, taken on line 10—10 of FIGURE 7, is a lateral cross-sectional view of the ski taken near the tip of the same;

FIGURE 11, taken on line 11—11 of FIGURE 7, is a lateral cross-sectional view of the ski near the rear end of the ski;

FIGURE 12 is a plan view of the metal blank of the ski of FIGURES 7–11 and on which metal blank there is bonded a plastic;

FIGURE 13 is a plan view of two longitudinal metal strips before they are fabricated to make the metal blank of FIGURE 12;

FIGURE 14 is a plan view of the two longitudinal strips after they have been cut to a desired configuration;

FIGURE 15 is a plan view of the two longitudinal metal strips of FIGURE 14 after they have been worked to conform to a desired configuration;

FIGURE 16 is a lateral cross-sectional view taken on line 16—16 of FIGURE 12 near the front of the ski and is at a position where there is no brace connecting the two longitudinal strips;

FIGURE 17 is a lateral cross-sectional view of another embodiment of a ski having outwardly and downwardly sloping sides;

FIGURE 18 is a lateral cross-sectional view of a racing ski;

FIGURE 19 is a lateral cross-sectional view of another embodiment of a racing ski;

FIGURE 20 is a lateral cross-sectional view of another embodiment of the ski of FIGURES 1–6;

FIGURE 21 is a lateral cross-sectional view of another embodiment of the ski of FIGURES 7–11.

Figure 22:
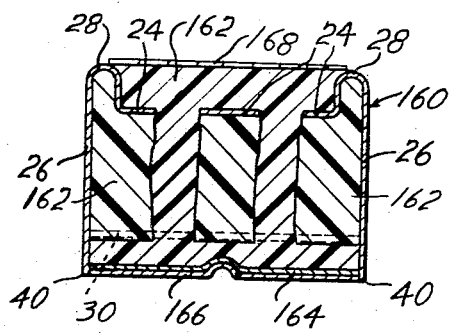
Figure 23:
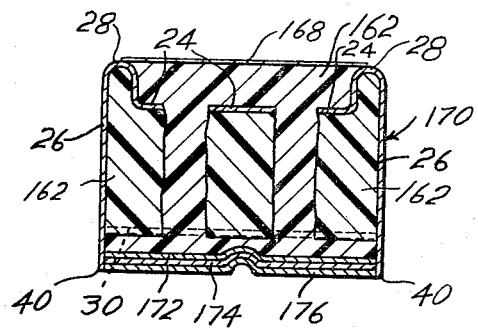
Figure 24:
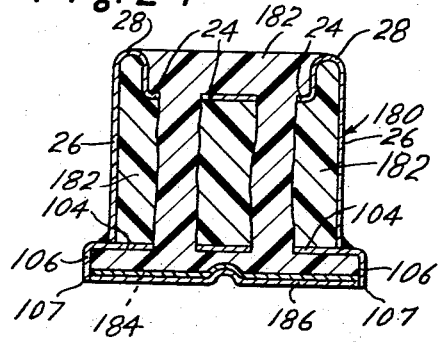
Figure 25:
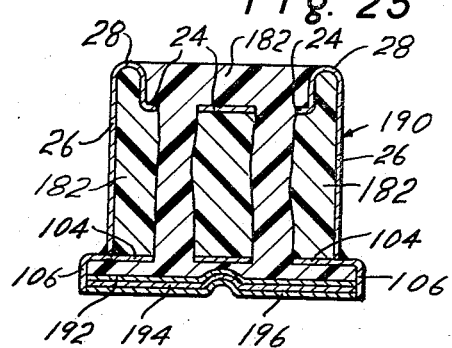
Figure 26:
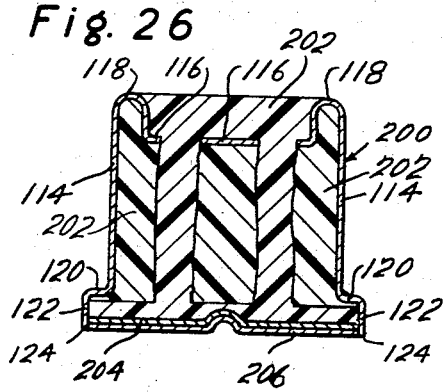
Figure 27:
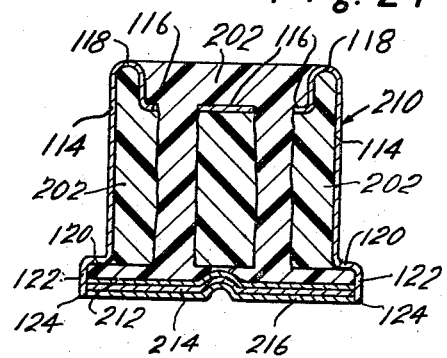

FIGURE 22 is a lateral cross-sectional view of another preferred embodiment of the ski and illustrates the details of construction;

FIGURE 23 is a lateral cross-sectional view of still another preferred embodiment of the ski and illustrates the details of construction;

FIGURE 24 is a lateral cross-sectional view of another preferred embodiment of the ski and illustrates the details of construction;

FIGURE 25 is a lateral cross-sectional view of another preferred embodiment of the ski and illustrates the details of construction;

FIGURE 26 is a lateral cross-sectional view of another preferred embodiment of the ski and illustrates the details of construction; and, FIGURE 27 is a lateral cross-sectional view of another preferred embodiment of the ski and illustrates the details of construction.

In the drawings, particularly FIGURES 1 through 6, it is seen that there is a ski 20 having a metal frame and a plastic bonded to the frame. The metal frame may be a one-piece frame 22 having a configuration generally that of a U in the lateral cross-section. The U has a base portion 24, and legs 26 on each side thereof. At the junction of the base portion 24 and each leg 26 the base portion raises upwardly and then curves to meet the leg so as to form a hump 28. As is seen the base portion 24 is below or recessed with respect to the humps 28. Also, the legs 26 are substantially parallel and are at substantially right angles to the base 24. These legs 26 may be swayed slightly outwardly. FIGURES 2, 3, 4, and 5 are taken at various positions along the ski. It is to be noted that the height of the hump with respect to the base portion 24 varies. The height of the hump is greater near the central portion of the ski and less near the ends of the ski. In FIGURE 6 there is illustrated a plan view of the metal frame 22. With respect to the construction of the ski, it is seen that near the the outer free ends of the legs 26 there is a connecting brace 30. This brace 30 may run substantially the entire length of the ski or from a weight factor there may be a multiplicity of these braces 30. These braces 30 may be spot welded to the inner face of each leg 26. In the lateral cross-sectional view of the ski it is seen that the base portion 24 separates the interior part of the ski from the upper surface and that the brace 30 separates the interior part of the ski from the lower surface. In the recessed base portion between the humps 28 there is positioned a high impact resistant molded plastic 32. Also, in the regions between the outer ends of the legs 26 and outside of the brace 30 there may be a high impact resistant plastic 34. In the interior of the ski, viz., between the legs 26, the base portion 24 and the brace 30, there may be a void 36, or a lightweight honeycomb structure or a plastic foam. In FIGURES 2 through 5 it is seen that the plastics 32 and 34 penetrate through the honeycomb structure or the plastic foam to form a continuous plastic running from the upper surface through the core to the lower surface.

In FIGURE 6 it is seen in the plan view that the ski tapers and has a narrow portion towards the front of the ski and broadens out into a broad portion as does a typical ski construction. Also, in the metal blank 22 there are a number of lightener holes or openings 38. Such lightener openings or holes are common to decrease the weight of metal structures.

The metal blank 22 is of one piece of metal and may be stamped to the desired configuration of a mold or, may be pounded around a mold to a desired configuration.

The flexibility of the ski aid the manner in which the ski springs is determined largely by the legs 26 and the humps 28. The main determining factor of the flexibility or the control for the majority of the flexibility is in the humps 28. The fine control or the fine adjustment of flexibility is in the legs 26. Another way of expressing this is that the set of the flexibility is in the humps 28 and the adjustment is in the legs 26. It is seen that the outer lower edge of the leg at 40 provides a cutting edge and a running edge for the ski.

In FIGURES 7 through 16 there is illustrated another species 50 of the ski. The ski 50 may be manufactured from two strips of metal. A sequence of steps in the manufacturing process is illustrated in FIGURES 13, 14, 15, and 12. In FIGURE 13 it is seen that there are two strips of metal 52. The strips 52 each comprise a leg portion 54, which rises into a hump 56 and then continues into a flat portion 58 which is directed away from the leg 54. The legs 54 may be substantially at right angles to the ledge 58 or may make a slight angle with the ledge 58.

In FIGURE 14 it is seen that the outer rear end of the ski to be is cut away or rounded at 60. Also, the central portion of the ledge 58 is partially removed to form the arcuate edge 62. Further, at the tip of the ski to be the base or ledge 58 is cut away or removed as indicated at 64.

In FIGURE 15 it is seen that the central portion of the region of the inner arcuate edge 62 has been worked or forced closer together so that the outer edges at 66 or the humps 56 and the legs 54 are now the arcuate surfaces. Also, what was the inner curved surface at 64 has now been forced together at the tip to form the outer curved surface 68.

In FIGURE 12 it is seen that the base or ledge portions 58 of the two longitudinal strips of FIGURE 15 are joined by braces 70. The braces 70 may be spot welded to the ledge portions 58.

A brace 72 connects the inner surfaces near the outer or free ends of the legs 54. The brace 72 may be one continuous brace or a plurality of intermittent braces. The brace or braces 72 may be spot welded to the inner surfaces of the legs 54.

It is seen that the ledges 58 and the braces 70 form what may be considered to be a brace portion of a generally U-shaped frame, in the lateral cross-section. Also, it is seen that each ledge 58 is recessed with respect to the hump and the brace 70 is recessed with respect to the free edges of the legs 54.

A high impact resistant molded plastic 74 may be positioned in the recessed portion near the base 58 and between the humps 56. This plastic is bonded to the metal frame. Also, there may be a high impact resistant plastic 76 outside of the brace 72 and between the outer free ends of the legs 54. Between the ledge 58, and the brace 72, and the legs 54 there is a void space which may be either a complete void 78 or be filled with a lightweight honeycomb structure or a foam plastic, to name a few. In FIGURES 8 through 11 it is seen that the plastics 74 and 76 penetrate through the honeycomb structure or the plastic foam to form a continuous plastic running from the upper surface through the core to the lower surface. The outer edge 80 of the leg 54 acts as a cutting and running surface for the ski.

The hump 56 in this particular set of skis is of a fixed height for the entire length of the ski or of a substantially fixed height for the entire length of the ski as is illustrated in FIGURES 8, 9, 10, 11 and 16. Again, the set of the flexibility of the ski is determined by the hump 56 and a small variation in this set is determined by the legs 54. In other words, the major factor in determining the flexibility of the ski is the hump 56 and the minor factor is the leg 54.

The ski of FIGURES 1 through 6 in addition to having a variable hump may also have a fixed hump. The hump may be determined by the mold on which the metal frame 22 is fabricated. Likewise, the ski in FIGURES 7 through 16 instead of having a fixed hump 56 may have a variable hump 56. The size of the hump is determined by the mold on which the longitudinal strip 52 is made.

In FIGURE 17 there is illustrated a ski 90 of the same general construction as the ski 20. This ski has a frame 92 having a configuration generally that of a U. The U has a base portion 24, and legs 94 on each side thereof. At the junction of the base portion 24 and the legs 94 the base portion rises upwardly and then curves to meet the leg so as to form a hump 28. As is seen, the base portion is below or recessed with respect to the hump 28. The legs depend downwardly and outwardly from the hump 28. The balance of the construction of the ski 90 is substantially the same as the ski 20 and like reference numerals will be used for like parts or elements.

In FIGURE 18 there is illustrated a racing ski 100 having the basic construction of the ski 20. On the lower ends of the legs 26 there is welded at 102 a running frame having a base 104, legs 106 and a running edge 107. It is seen that the base 104 is wider than the spacing between the legs 26. In the base 104 there are lightener openings 108. The volume between the base portion 24, the base 104 and the legs 20 may be filled with a honeycomb structure or a plastic foam 36. A high impact resistant plastic 32 may be in the cup between the base portion 24 and the hump 28. And, a high impact resistant plastic may be in the cup between the base 104 and the legs 106.

In FIGURE 19 there is illustrated a lateral cross-sectional view of a racing ski 110 having a construction similar to the ski 100. There is a metal frame 112 having legs 114, a base portion 116, and a hump 118 between each leg 114 and the base portion 116. The legs 114 are substantially at right angles to the base portion 116. The legs 114 flare outwardly at 120 and then into short legs 122. The outer edge 124 of each leg 122 is a cutting edge or running edge of the ski. In the base portion 116 there are lightener openings 126. In the cup formed by the base portion 116 and the humps 118 there is a high impact resistant plastic 128, and between the legs 122 there is a high impact resistant plastic 130. Between the plastic 130 and the base portion 116 there is a void which may be filled with a plastic foam or a honeycomb structure 132. The plastics 128 and 130 seep and work their way, before curing through 132 so as to form a connected plastic structure. It is to be noted that the plastic 130 is of sufficient tensile strength to prevent the legs 122 spreading apart upon receiving a blow. Because of this tensile strength there is no need to have a brace connecting the legs 122 or 114.

It is seen that the racing skis 100 and 110 have a wider running surface than the conventional ski. The main set of the flexibility of the ski is determined by the humps 28 or 118, and the minor set of flexibility is determined by the legs 26 and 106 of the ski 100 and the legs 114 and 122 of the ski 110.

In FIGURE 20 there is illustrated a lateral cross-sectional view of a ski 140 constructed similarly to the ski 20 except that there is no connecting brace or tying-in brace 30. As the metal constructions of the skis 20 and 140 are similar except for this brace, the same reference numerals are used for like parts or elements. In the ski 140 the resin 34 has a strong tensile strength and functions as a connecting brace between the legs 26.

In FIGURE 21 there is illustrated a lateral cross-sectional view of a ski 150 constructed similarly to the ski 50 except that there is no connecting brace or tying-in brace 72. As the metal constructions of the skis 50 and 150 are similar except for this brace, the same reference numerals are used for like parts or elements. In the ski 150 the resin 76 has a strong tensile strength and functions as a connecting brace between the legs 54.

In the construction of the skis it is to be noted that there is a high impact resistant plastic on the top and a high impact resistant plastic on the bottom. This influences the flexibility of the ski. For example, assuming that the skier lands hard on the ski so that the back and the tip are flexed upwardly, or runs over an object so that the tip is flexed upwardly, the resin on the bottom is in tension and the resin on the top is in compression. Because of the tension and compression forces, the ski tends to assume an equilibrium configuration. The same resin on the top and the bottom of the ski tends to make a balanced ski. As the same resin is employed for the bottom and the top, there is no undue strain due to uneven forces in the resin.

The metal skeleton frame of the ski, more particularly the frame 22 or the longitudinal strip members 52, may be a stainless steel. Such a stainless steel may be type 306, commonly known as 18-8, 18% chromium and 8% nickel. The high impact resistance multiple plastics 32 and 34, 74 and 76, and 128 and 130, which are the bearing surfaces for the ski, such as where the binders are attached to the ski and also the running surface for the ski in the snow may be one of many plastics. Suitable plastics may be urethane, polyethylene, Teflon or tetrafluoropolyethylene, filled or unfilled polyester, and filled or unfilled epoxy. The core materials 36, 78 and 132 may be one of many materials. One material may be air, as the core may be hollow. Other suitable materials are honeycomb structures of paper or aluminum or plastic or other such honeycomb materials. Further materials may be a plastic foam, such as a urethane foam, or a polyethylene foam, or expanded polystyrene bead. These are lightweight fillers. Naturally, the high impact resistant multiple plastics are bonded to the metal frame and the lightweight fillers such as the honeycomb or foam fillers maybe bonded to the frame. The high impact multiple plastics such as urethane, polyethylene and tetrafluoropolyethylene, polyester and epoxy are dense materials. The weight of these materials, if used as the entire plastic in the ski, would be so great that many people would find it difficult to carry the ski. Therefore, to decrease the weight of the ski without decreasing the strength of the ski it is desirable to replace the dense plastic in the core of the ski with a less dense material. The metal frame 22 or the longitudinal strips 52 may be of various thicknesses of stainless steel such as one-eighth of an inch down to one-thirty second of an inch, or of 0.030 gauge. Actually, the thickness of the stainless steel determines, to a degree, the weight of the ski and also the flexibility of the ski. The heavier gauge metal will normally result in a less flexible ski.

From the foregoing it is seen that I have provided a ski and a method for making a ski which is relatively light-in-weight, which does not require wax, has a ihgh impact resistant plastic used as running surfaces 34 or 76 or 130, has a low coefficient of friction, requires only a small amount of hand labor in the manufacture of the ski, requires little maintenance as the exposed metal frame is of stainless steel or other weather resistant material, and can be manufactured from readily available commercial materials.

In FIGURE 22 there is illustrated a ski 160 having a metal frame comprising a base 24, legs 26, humps 28 between the base 24 and the legs 26 and the running edge 40. In the main portion of the ski between the legs 26 and also between the humps 28 and above the base 24 there is a filler such as a solid polymeric foam. A suitable solid polymeric foam may be polyurethane, polystyrene, epoxy, polyester foam or a combination of these foams. The solid polymeric foam may be an open-cell or closed-cell foam having a density in the range of 4 to 30 pounds per cubic foot. The foam may be foamed in place. This foam is referred to by reference numeral 162. Also, between the legs 26 and near the running edge 40 is a reinforcement or a reinforcing material 164. The reinforcing material 164 may be of a cloth base such as nylon, Dacron, Fiberglas, cotton, or rayon cloth. To this cloth there is added a resin such as a polyester resin or epoxy resin or a polyurethane. The resin may be cured so as to make the cloth a rigid structure. The cloth is bonded to the solid polymeric foam 162. The cloth may be bonded by means of a resin or the cloth may be bonded by pouring the ingredients of the foam, before foaming, through the cloth and into the channel formed by the base 24 and the legs 26. Then the ingredients are foamed in place. The metal may be primed so that the foam 102 bonds to the metal. If the resin is added to the cloth of the reinforcing material 164, then the resin bonds to the metal. There is a running surface 166. This running surface 166 is positioned outside of the reinforcement 164 and between the ends of the legs 26 and adjacent to the running edges 40. The running surfaces may be of many different materials such as polyethylene, tetrafluoropolyethylene, polyvinyl alcohol, polyvinyl chloride, or polypropylene. Further, the running surface 166 may be a filled polyurethane, a filled epoxy, or a filled tetrafluoropolyethylene. These materials may be filled with graphite or molybdenum disulfide, to name a few.

The reinforcement 164 may vary in thickness from 0.001 of an inch to 0.030 of an inch. The running surface 166 will vary in thickness from 0.050 of an inch to 0.13 inch.

The volume between the humps 28 and above the base 24 may be filled with a foam material such as 162 or may be filled with a polyurethane. On top of this material there may be positioned an abrasive resistant surface 168 such as a stripped polyvinyl chloride or mica. On 168 the skier positions his boot. Therefore, it is desirable to have an abrasive resistant material on this surface as well as a decorative material.

If the running surface 166 be polyethylene, then the polyethylene may be bonded to the reinforcing material 164 by an adhesive having a catalyst. The catalyst may be spread on the reinforcing material 164 or on the surface of the polyethylene. Then the polyethylene may be applied to the reinforcing material 164. The catalyst causes a generation of heat in the adhesive so that the polyethylene bonds to the reinforcing material 164. Or, the polyethylene 164 may be flame retarded by exposing to a blow torch or the like or radiation may be used on the polyethylene. Then, the polyethylene may be applied to the reinforcing material 164 and the temperature raised to approximately 100 degrees Fahrenheit (100° F.). By applying pressure to the polyethylene, the polyethylene is bonded to the reinforcing material 164 under these conditions.

In FIGURE 23 there is illustrated a lateral cross-sectional view of a ski 170 having a face 24, humps 28, legs 26, and running edges 40. The core of the ski may be solid polymeric foam 162 such as described with reference to FIGURE 20. There may be positioned on the outer surface of the core 162, and between the legs 26, a film of polyvinyl chloride 172. The polyvinyl chloride 172 may be bonded by means of a suitable adhesive such as a polyester resin, and epoxy resin, or a polyurethane resin. Then, there may be a reinforcing material 174 similar to the reinforcing material 164 described with respect to FIGURE 22 and ski 160. More particularly, this reinforcing material 174 may be a cloth, such as nylon, Dacron, Fiberglas, cotton, rayon, impregnated with a resin such as a polyester resin or epoxy resin. Then, there may be applied to the outer surface of the reinforcing material 174, between the legs 26 and the running edges 40, a running surface 176. This running surface 176 may be similar to the running surface 166 described with respect to ski 100. More particularly, this running surface 176 may be of polyethylene, tetrafluoropolyethylene, polypropylene, or a filled polyurethane, or a filled tetrafluoropolyethylene, or a filled epoxy. The material used for filling purposes may be graphite or molybdenum disulfide.

The polyvinyl chloride layer 172 may have a thickness in the range of 0.005 to 0.01 inch. The thickness of the reinforcing material 174 may be in the range of 0.001 to 0.0030 inch, and the thickness of the running surface 176 may be in a range of 0.05 to 0.13 inch.

In the skis 160 and 170 there may or may not be braces 30 connecting the interior surface of the legs 26.

In FIGURE 24 there is illustrated a ski 180 having the basic metal frame as the ski 100 of FIGURE 18 in that there is a base 24 positioned between two humps 28 and which humps 28 connect the base 24 to the legs 26. On the lower end of the legs 26 there is welded at 102 a running frame having a base 104, legs 106, and a running edge 107. It is seen that the base 104 is wider than the spacing between the legs 26. In the base 104 there are lightener openings 108. That portion of the ski between the humps 28 and above the base 24 and below the base 24 and the legs 26, and also below the base 104 and between the legs 106 may be filled with solid polymeric foam 182 similar to the foam 162. The solid polymeric foam 182 may be bonded to the metal frame. Also, on the outside of the solid polymeric foam 182 and between the legs 106 may be bonded a reinforcing material 184. This reinforcing material 184 may be bonded with solid polymeric foam 182 and also to the inside of the legs 106. In addition, there may be bonded a running surface 186 to the reinforcing material 184 and the inside of the legs 106 and the running edges 107. The reinforcing material 184 may be of the same as the reinforcing material 164 and 174. The running surface 186 may be the same as the running surfaces 166 and 176.

In FIGURE 25 there is illustrated a ski 190 having generally the same construction as ski 180. However, at the bottom of the solid polymeric foam 182, below the base 104 and between the legs 106 there is bonded polyvinyl chloride 192. The polyvinyl chloride 192 may be bonded the same as the polyvinyl chloride 172 to the foam 162 in ski 170. Then, there is a reinforcing material 194 between the legs 106. The reinforcing material 194 may be the same as the reinforcing materials 164, 174, 184. On the outside of the reinforcing material 194 and between the ends of the legs 106 and the running edges 107 there may be running surface 196. The running surface 196 may be the same as the running surfaces 166, 176, and 186.

In FIGURE 26 there is illustrated a ski 200 similar in construction to ski 110. Ski 200 has a base 116 which rises to form two humps 118. The humps 118 connect with legs 114. The lower ends of the legs 114 flare outwardly at 120. Then, the legs 114 after flaring outwardly at 120, form legs 122. The lower outer edge of each leg 122 has the cutting or running surface 124. In the body of the ski 200 and above the base 116 and between the humps 118, between the legs 114, and between the legs 122, there may be a solid polymeric foam 202. On the lower outer surface of the solid polymeric foam 202 there may be bonded a reinforcing material 204. The reinforcing material 204 is similar to reinforcing materials 164, 174, 184, and 194. Also, the reinforcing material 202 is bonded to the inside surface of the legs 122. On the outside surface of the reinforcing material 204 and between the legs 122 and the running edges 124 there is bonded a running surface 206. The running surface 206 is similar to the running surfaces 166, 176, 186 and 196.

In FIGURE 27 there is illustrated a ski 210 having generally the same construction as the ski 200. However, at the bottom of the solid polymeric foam 202 and between the legs 114 there is bonded polyvinyl chloride 212. The polyvinyl chloride 212 may be bonded the same as the polyvinyl chloride 172 is bonded to the foam 162 in ski 170 and may be bonded the same as the polyvinyl chloride 192 is bonded to the foam 182 in the ski 190. Then, there is a reinforcing material 214 between the legs 114. The reinforcing material 214 may be the same as the reinforcing materials 164, 174, 184 and 194. On the outside of the reinforcing material 214 and between the ends of the legs 122 and the running edges 124 there may be running surface 216. The running surface 216 may be the same as the running surfaces 166, 176, 186, 196 and 206.

The reinforcing materials 164, 174, 184, 194, 204 and 214 and the plastics 162, 172, 182 and 202 being bonded to the legs 26 and 114 function as a brace tying together the legs and imparting structural strength to the ski.

Having presented my invention what I claim is:
1. A ski, said ski comprising:
 (A) a skeleton frame and a body;
 (B) said frame in a lateral cross-sectional view presenting the general configuration of a U;
 (C) said U having a base and downwardly directed legs;
 (D) said legs being substantially parallel and substantially at right angles to the base;
 (E) said base and said legs at their junctions forming humps so that the base portion is recessed below the hump;
 (F) said humps being of varying height with respect to the recessed base;
 (G) said humps being of greater height at the central portion of the ski and of less height at the ends of the ski; and,
 (H) said body being bonded to said frame and encompassing part of said frame.

2. A ski according to claim 1 comprising:
(A) a fibrous reinforcing material between said legs near the outer edges of said legs;
(B) a running surface between said legs; and,
(C) said fibrous reinforcing material being positioned between said body and said running surface.

3. A ski according to claim 2 and comprising:
(A) said body being a solid polymeric foam;
(B) polyvinyl chloride between said legs; and,
(C) said polyvinyl chloride being positioned between said body and said fibrous reinforcing material.

4. A ski according to claim 2 and comprising:
(A) said fibrous reinforcing material being resin impregnated fiberglass reinforcement material; and,
(B) said running surface being polyethylene bonded to said reinforcing material and to said legs.

5. A ski according to claim 1 and comprising:
(A) said skeleton frame being of one piece of metal;
(B) a brace tying together the lower part of said legs and being integral with said legs;
(C) said body comprising a relatively light-in-weight core between the brace and the base of the U; and,
(D) said body comprising a surfacing material on the outside of the brace and between the legs and on the outside of the base of the U and between the humps.

6. A ski according to claim 1 and comprising:
(A) said skeleton frame being of one piece of metal;
(B) a brace tying together the lower part of said legs and being integral with said legs;
(C) a fibrous reinforcing material between said legs near the other edges of said legs;
(D) a running surface between said legs; and,
(E) said fibrous reinforcing material being positioned between said body and said running surface.

7. A ski according to claim 6 and comprising:
(A) said fibrous reinforcing material being resin impregnated fiberglass reinforcement material; and
(B) said running surface being polyethylene bonded to said reinforcing material and to said legs.

8. A ski according to claim 1 and comprising:
(A) a brace tying together the lower part of said legs and being integral with said legs;
(B) said body comprising a relatively light-in-weight core between the brace and the base of the U;
(C) said body comprising a surfacing material on the outside of the brace and between the legs and on the outside of the base of the U and between the humps; and,
(D) the lower outside edges of the legs being free of a cover so as to provide a cutting surface.

9. A ski, said ski comprising:
(A) a metal skeleton frame and a body;
(B) said frame a lateral cross-sectional view presenting the general configuration of a U;
(C) said U having a base and downwardly directed legs;
(D) said base and said legs at their junctions forming humps so that the base portion is recessed below the humps;
(E) said metal skeleton frame being of one piece of metal;
(F) a brace tying together the lower parts of said legs;
(G) said brace being integral with said legs;
(H) said body being bonded to said frame;
(I) said body comprising a relatively light-in-weight core between the brace and the base of the U; and,
(J) said body comprising s surfacing material on the outside of the brace and between the legs and on the outside of the base of the U and between the humps.

10. A ski according to claim 9 and comprising:
(A) a fibrous reinforcing material between said legs near the outer edges of said legs;
(B) a running surface between said legs; and,
(C) said fibrous reinforcing material being positioned between said body and said running surface.

11. A ski according to claim 10 and comprising:
(A) said body being a solid polymeric foam;
(B) polyvinyl chloride between said legs; and,
(C) said polyvinyl chloride being positioned between said body and said fibrous reinforcing material.

12. A ski according to claim 10 and comprising:
(A) said fibrous reinforcing material being resin impregnated fiberglass reinforcement material; and
(B) said running surface being polyethylene bonded to said reinforcement material and to said legs.

13. A ski according to claim 9 and comprising:
(A) said legs being substantially parallel and substantially at right angles to the base;
(B) said humps being substantially the same height with respect to the recessed base for the entire length of the ski;
(C) the lower outside edges of the legs being free of a cover so as to provide a cutting surface.

14. A ski according to claim 13 and comprising:
(A) a fibrous reinforcing material between said legs near the outer edges of said legs;
(B) a running surface between said legs; and,
(C) said fibrous reinforcing material being positioned between said body and said running surface.

15. A ski according to claim 14 and comprising:
(A) said body being a solid polymeric foam;
(B) polyvinyl chloride between said legs; and,
(C) said polyvinyl chloride being positioned between said body and said fibrous reinforcing material.

16. A ski according to claim 14 and comprising:
(A) said fibrous reinforcing material being resin impregnated fiberglass reinforcement material; and,
(B) said running surface being polyethylene bonded to said reinforcing material and to said legs.

17. A ski according to claim 9 and comprising:
(A) said metal skeleton frame being composed of two longitudinal strips;
(B) each of said strips comprising one of said downwardly directed legs and a portion of said base; and
(C) a multiplicity of braces connecting together the base portions of the longitudinal strips.

18. A ski according to claim 17 and comprising:
(A) a fibrous reinforcing material between said legs near the outer edges of said legs;
(B) a running surface between said legs; and,
(C) said fibrous reinforcing material being positioned between said body and said running surface.

19. A ski according to claim 18 and comprising:
(A) said body being a solid polymeric foam;
(B) polyvinyl chloride between said legs; and
(C) said polyvinyl chloride being positioned between said body and said fibrous reinforcing material.

20. A ski according to claim 18 and comprising:
(A) said fibrous reinforcing material being resin impregnated fiberglass reinforcement material; and,
(B) said running surface being polyethylene bonded to said reinforcing material and to said legs.

21. A ski according to claim 17 and comprising:
(A) said humps being substantially the same height with respect to the recessed base for the entire length of the ski.

22. A ski according to claim 17 and comprising:
(A) said humps being of greater height at the central portion of the ski and of less height at the ends of the ski.

23. A ski according to claim 9 and comprising:
(A) said legs being outwardly directed legs.

24. A ski according to claim 9 and comprising:
(A) said body being a high impact resistant plastic, said body being in the recessed portion of the base; and,
(B) said core being a honeycomb structure.

25. A ski according to claim 9 and comprising:
(A) said body being a high impact resistant plastic; and
(B) said core being a plastic foam.

26. A ski according to claim 9 and comprising:
(A) the lower ends of said legs flaring outwardly to form a broad running surface.

27. A ski according to claim 26 and comprising:
(A) a fibrous reinforcing material between said legs near the outer edges of said legs;
(B) a running surface between said legs; and,
(C) said fibrous reinforcing material being positioned between said body and said running surface.

28. A ski according to claim 27 and comprising:
(A) said body being a solid polymeric foam;
(B) polyvinyl chloride between said legs; and,
(C) said polyvinyl chloride being positioned between said body and said fibrous reinforcing material.

29. A ski according to claim 27 and comprising:
(A) said fibrous reinforcing material being resin impregnated fiberglass reinforcement material; and,
(B) said running surface being polyethylene bonded to said reinforcing material and to said legs.

30. A ski, said ski comprising:
(A) a skeleton frame and a body;
(B) said frame in a lateral cross-sectional view presenting the general configuration of a "U";
(C) said "U" having a base and downwardly directed legs;
(D) the lower ends of said legs flaring outwardly to form a broad running surface;
(E) said base and said legs at their junctions forming humps so that the base portion is recessed below the humps; and,
(F) said body having a surfacing plastic in the recessed portion of the base and said body having a surfacing plastic between the free ends of said legs to function as a bearing and running surface.

31. A ski according to claim 30 and comprising:
(A) a fibrous reinforcing material between said legs near the outer edges of said legs;
(B) a running surface between said legs; and
(C) said fibrous reinforcing material being positioned between said body and said running surface.

32. A ski according to claim 31 and comprising:
(A) said body being a solid polymeric foam;
(B) polyvinyl chloride between said legs; and,
(C) said polyvinyl chloride being positioned between said body and said fibrous reinforcing material.

33. A ski according to claim 31 and comprising:
(A) said fibrous reinforcing material being resin impregnated fiberglass reinforcement material; and,
(B) said running surface being polyethylene bonded to said reinforcing material and to said legs.

34. A ski according to claim 30 and comprising:
(A) each of said legs being of the same continuous metal.

35. A ski according to claim 34 and comprising:
(A) a fibrous reinforcing material between said legs near the outer edges of said legs;
(B) a running surface between said legs; and,
(C) said fibrous reinforcing material being positioned between said body and said running surface.

36. A ski according to claim 35 and comprising:
(A) said body being a solid polymeric foam;
(B) polyvinyl chloride between said legs; and,
(C) said polyvinyl chloride being positioned between said body and said fibrous reinforcing material.

37. A ski according to claim 35 and comprising:
(A) said fibrous reinforcing material being resin impregnated fiberglass reinforcement material; and,
(B) said running surface being polyethylene bonded to said reinforcing material and to said legs.

38. A method for making a ski, said method comprising:
(A) forming two longitudinal strips so that each strip has a leg which curves back on itself to form a hump and then curves outwardly to form a base portion;
(B) said base portion being recessed with respect to the hump;
(C) joining said base portions with a plurality of braces so that the legs are on the outside;
(D) connecting a brace between the free ends of the depending legs;
(E) bonding a plastic to the recessed base portion between the humps; and,
(E) bonding a plastic to the brace and the outer part of the depending legs.

39. A method according to claim 38 and comprising:
(A) positioning a fibrous reinforcing material between said legs near the outer edges of said legs;
(B) positioning a running surface between said legs; and
(C) said fibrous reinforcing material being positioned between said plastic and said running surface.

40. A method according to claim 39 and comprising:
(A) said plastic being a solid polymeric foam;
(B) positioning polyvinyl chloride between said legs; and,
(C) said polyvinyl chloride being positioned between said plastic and said fibrous reinforcing material.

41. A method according to claim 39 and comprising:
(A) said fibrous reinforcing material being resin impregnated fiberglass reinforcement material; and,
(B) said running surface being polyethylene bonded to said reinforcing material and to said legs.

42. A ski, said ski comprising:
(A) a skeleton frame and a body;
(B) said frame in a lateral cross-sectional view presenting the general configuration of a U,
(C) said U having a base and downwardly directed legs;
(D) said base and said legs at their junction forming a hump so that the base portion is recessed below the hump and said body being bonded to said frame and encompassing part of said frame;
(E) a fibrous reinforcing material between said legs near the outer edges of said legs
(F) a running surface between said legs; and,
(G) said fibrous reinforcing material being positioned between said body and said running surface.

43. A ski according to claim 42 and comprising:
(A) said body being a solid polymeric foam;
(B) polyvinyl chloride between said legs; and,
(C) said polyvinyl chloride being positioned between said body and said fibrous reinforcing material.

44. A ski according to claim 43 and comprising:
(A) said fibrous reinforcing material being resin impregnated fiberglass reinforcing material; and,
(B) said running surface being polyethylene bonded to said reinforcing material and to said legs.

45. A method for making a ski, said method comprising:
(A) forming a metal skeleton frame;
(B) said frame having a general lateral cross-sectional configuration of a U with a base portion and depending legs with the base portion and the legs forming a hump at their junction so that the base portion is recessed with respect to the hump;
(C) applying a plastic to said frame;
(D) curing and bonding the plastic to said frame;
(E) positioning a fibrous reinforcing material between said legs near the outer edges of said legs;
(F) positioning a running surface between said legs; and
(G) said fibrous reinforcing material being positioned between said plastic and said running surface.

46. A method for making a ski according to claim 45 and comprising:
(A) said plastic being a solid polymeric foam;
(B) positioning polyvinyl chloride between said legs; and, (C) said polyvinyl chloride being positioned between said plastic and said fibrous reinforcing material.

47. A method for making a ski according to claim 45 and comprising:
(A) said fibrous reinforcing material being resin impregnated fiberglass reinforcement material; and,
(B) said running surface being polyethylene bonded to said reinforcing material and to said legs.

References Cited

UNITED STATES PATENTS

| | | | |
|---|---|---|---|
| 2,164,604 | 7/1939 | Whiteford | 280—11.13 |
| 2,728,702 | 12/1955 | Simon et al. | |
| 2,851,277 | 9/1958 | Holmberg et al. | 280—11.13 |
| 2,908,506 | 10/1959 | Runton | 280—11.13 |
| 2,920,898 | 1/1960 | Metcalfe et al. | 280—11.13 |
| 3,074,732 | 1/1963 | Riha | 280—11.13 |
| 3,132,874 | 5/1964 | Baudou | 280—11.13 |

FOREIGN PATENTS

| | | |
|---|---|---|
| 215,868 | 6/1961 | Austria. |
| 655,338 | 1/1963 | Canada. |
| 1,254,377 | 1/1961 | France. |
| 1,288,203 | 2/1962 | France. |
| 631,879 | 11/1949 | Great Britain. |

BENJAMIN HERSH, *Primary Examiner.*

MILTON L. SMITH, *Examiner.*